Aug. 11, 1925.
J. G. BAIN
TRAP
Filed May 11, 1923
1,549,566
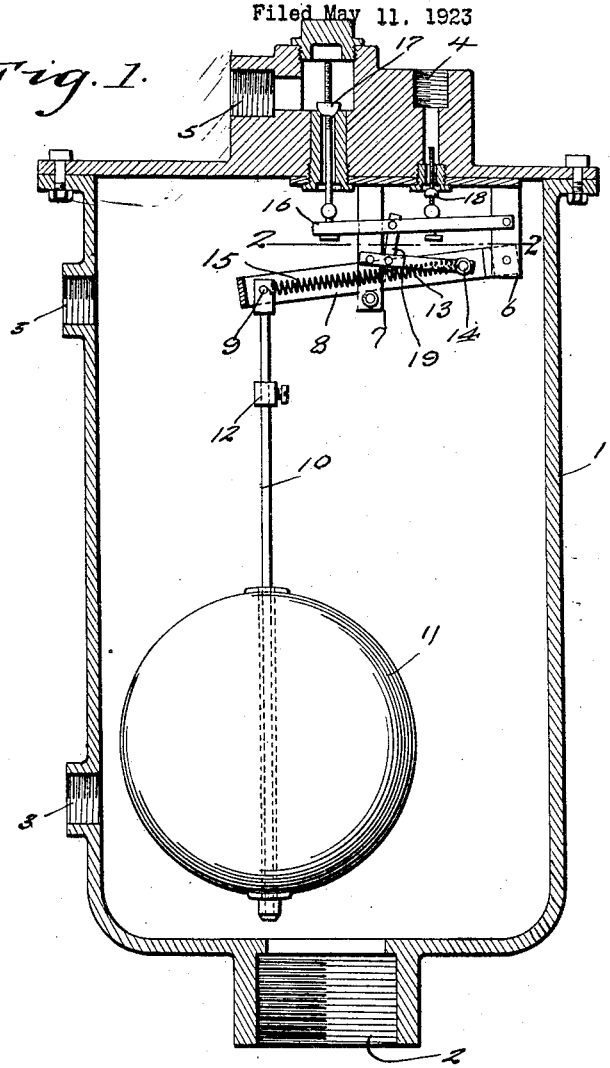
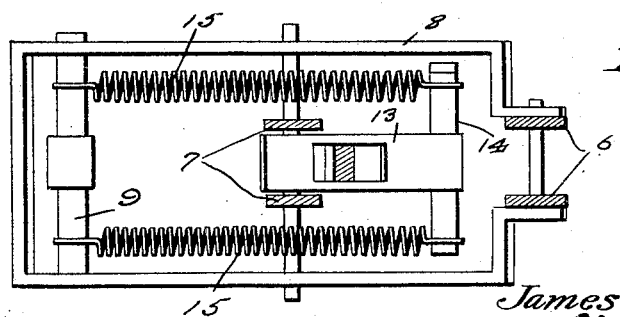
James G. Bain INVENTOR Patented Aug. 11, 1925.

1,549,566

UNITED STATES PATENT OFFICE.

JAMES GARFIELD BAIN, OF HELENA, MONTANA.

TRAP.

Application filed May 11, 1923. Serial No. 638,331.

*To all whom it may concern:*

Be it known that I, JAMES GARFIELD BAIN, a citizen of the United States, residing at Helena, in the county of Lewis and Clark and State of Montana, have invented new and useful Improvements in Traps, of which the following is a specification.

This invention relates to a trap, the general object of the invention being to provide means for automatically causing the water of condensation in the trap to be forced back into the boiler by the steam pressure when the water level reaches a certain point.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a longitudinal sectional view of the invention showing the parts thereof in elevation.

Figure 2 is a section on line 2—2 of Figure 1.

In these views 1 indicates the body of the trap which is provided with the port 2 in its bottom for receiving the connection to the device upon which it is used so that water of condensation will enter the trap. It is also provided with the ports 3 for permitting a sight gage to be connected therewith. The top of the device is provided with the air escape and exhaust port 4 and the steam inlet 5. Depending pieces 6 and 7 are connected with the plate carried by the top of the device and a frame 8 is pivotally connected with the piece 6. The free end of this frame carries a shaft 9 to which the float rod 10 is connected. The float 11 is slidably mounted on the rod and a collar 12 is adjustably secured to the rod, this collar being arranged to be struck by the float. A lever 13 is pivoted to the depending part 7 and the free end of this lever carries a shaft 14. Coil springs 15 have their ends connected with the shafts 9 and 14. A valve lever 16 is pivoted to the depending part 6 and carries the valve 17 for the inlet passage 5 and the valve 18 for the air exhaust 4. A link 19 connects the lever 16 with the lever 13.

From the foregoing it will be seen that as the water of condensation rises in the trap air will pass therefrom through the port 4 as the valve 18 is opened. The valve 17 prevents steam from entering the trap. When the water reaches a certain level the float 11 will strike the collar 12 and thus force the frame 8 upwardly and as soon as the springs 15 pass the longitudinal center of the lever 13 they will throw said lever 13 upwardly and this movement will be communicated to the valve member 16 so that the valve 18 will be closed and the valve 17 opened. This will permit the steam to enter the trap and force the water back to the boiler, the valve 18 preventing the steam escaping through the port 4. As soon as the float drops it will return the parts to their normal position and thus shut off the entrance of steam to the trap.

The depending part 7 acts as a stop for the frame 8 and relieves the spring from undue strain when the trap is empty. Attention is called to the fact that the entire brass working parts are fastened to the cover by the two brass bushings which form the valve seats.

It is thought from the foregoing description that the advantages and novel features of the invention will be readily apparent.

I desire it to be understood that I may make changes in the construction and in the combination and arrangement of the several parts, provided that such changes fall within the scope of the appended claim.

What I claim is:—

A device of the class described comprising a chamber for receiving the water of condensation, said chamber having an air exhaust port and a steam inlet, valves for controlling the ports, a pivoted lever to which the valves are connected, a second pivoted lever, a link connecting the two levers together, a frame pivoted in the chamber, a shaft carried by the free end of the frame, springs connecting the shaft with the free end of the second lever and arranged to move said lever upwardly when the frame is lifted to carry the springs above the pivotal center of the lever to operate the valves in unison through the medium of the link and first mentioned lever, a float rod connected to the shaft, a float slidably mounted on the rod and a collar adjustably mounted on the rod to limit the movement of the float.

In testimony whereof I affix my signature.

JAMES GARFIELD BAIN.